(12) United States Patent
Shimada et al.

(10) Patent No.: US 7,248,800 B2
(45) Date of Patent: Jul. 24, 2007

(54) OPTICAL RECEIVER, OPTICAL TRANSMITTER AND OPTICAL TRANSCEIVER

(75) Inventors: Kazuhiro Shimada, Kanagawa (JP); Asako Ikeda, Tokyo (JP); Shigeyuki Sakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 10/685,996

(22) Filed: Oct. 14, 2003

(65) Prior Publication Data
US 2004/0240887 A1    Dec. 2, 2004

(30) Foreign Application Priority Data
May 30, 2003  (JP) .............................. 2003-154910
May 30, 2003  (JP) .............................. 2003-154934

(51) Int. Cl.
*H04B 10/00*  (2006.01)
(52) U.S. Cl. ...................... 398/135; 398/138; 398/139; 398/136; 398/137; 398/202; 398/182; 398/186; 398/195; 398/200; 398/201; 398/208; 398/213; 398/214; 398/140; 398/141; 398/164; 398/162; 398/128; 398/130; 385/24; 385/15; 385/27; 385/31
(58) Field of Classification Search ............... 398/202, 398/208, 212, 214, 182, 186, 195, 200, 201, 398/135, 136, 138, 128, 130, 137, 139, 213, 398/164, 162, 140, 141; 385/24, 15, 27, 385/31

See application file for complete search history.

(56) References Cited

U.S. PATENT DOCUMENTS

| | | | |
|---|---|---|---|
| 4,989,935 A * | 2/1991 | Stein ........................... | 250/551 |
| 5,200,608 A | 4/1993 | Kitajima | |
| 5,299,046 A * | 3/1994 | Spaeth et al. ................ | 398/135 |
| 5,408,102 A | 4/1995 | Okumura | |
| 5,526,160 A | 6/1996 | Watanabe et al. | |
| 5,664,035 A * | 9/1997 | Tsuji et al. .................... | 385/24 |
| 6,609,840 B2 * | 8/2003 | Chow et al. .................. | 398/102 |
| 6,626,584 B2 * | 9/2003 | Fujita et al. .................. | 385/88 |
| 6,717,972 B2 | 4/2004 | Steinle et al. | |

FOREIGN PATENT DOCUMENTS

| | | |
|---|---|---|
| JP | 61-156251 | 9/1986 |
| JP | 02-79640 | 6/1990 |
| JP | 04-113713 | 4/1992 |
| JP | 06-097597 | 4/1994 |
| JP | 06-169136 | 6/1994 |
| JP | 07-015310 | 1/1995 |
| WO | 01/57977 | 8/2001 |

* cited by examiner

*Primary Examiner*—Hanh Phan
(74) *Attorney, Agent, or Firm*—Hogan & Hartson LLP

(57) ABSTRACT

An optical receiver includes a first light receiving element to convert an optical signal to an electric signal and to output the electric signal from one end. A light receiving element row is connected to the other end of the first light receiving element to supply electric power to the first light receiving element. The light receiving element row includes a plurality of second light receiving elements connected in series.

1 Claim, 10 Drawing Sheets

OPTICAL RECEIVER, OPTICAL TRANSMITTER AND OPTICAL TRANSCEIVER

CROSS-REFERENCE TO RELATED APPLICATIONS

This application is based upon and claims the benefit of priority from the prior Japanese Patent Applications No. 2003-154910 and No. 2003-154934, filed on May 30, 2003, the entire contents of which are incorporated herein by reference.

BACKGROUND OF THE INVENTION

1. Field of the Invention

The present invention relates to an optical receiver, optical transmitter and optical transceiver.

2. Related Background Art

FIG. 5 is a circuit diagram of a conventional optical receiver. The conventional optical receiver includes a light receiving element 2, an amplifier circuit 4 and a capacitor 8. The light receiving element 2 receives an optical signal, and generates an optical current. The amplifier circuit 4 amplifies the optical current generated in the light receiving element 2, and outputs the amplified optical current. The capacitor 8 is provided to remove noise from a power supply Vcc, which supplies a voltage to the amplifier circuit 4.

In the conventional optical receiver, the power supply Vcc, which supplies the voltage to the amplifier circuit 4, is connected to the light receiving element 2 as well. Therefore, the power supply Vcc not only supplies the voltage to the amplifier circuit 4, but also applies a reverse bias voltage to the light receiving element 2.

FIG. 19 is a schematic diagram of a conventional optical transceiver. The optical transceiver includes a light emitting element 1 and a light receiving element 3 for signal transmission. The light emitting element 1 and the light receiving element 3 can be mounted on a single light-transmitting package.

FIG. 20 is a schematic diagram of another conventional optical transceiver. A light emitting element 1 is disposed on a light receiving element 3. As a result, the optical transceiver is small-sized, and the light emitting element 1 and the light receiving element 3 can respectively transmit and receive signals via the same optical fiber.

As the reverse bias voltage applied to the light receiving element 2 in the conventional optical receiver is made greater, the capacitance and resistance of the light receiving element 2 for high frequency signals become lower. The greater the reverse bias voltage becomes, therefore, the more the optical receiver suits high-rate communication.

In the conventional optical receiver, however, it is impossible to apply to the light receiving element 2 a voltage which is larger than the power supply voltage Vcc supplied to the amplifier circuit 4. In other words, there is a problem that the transmission rate of the optical receiver is limited by a value of the power supply voltage Vcc.

The capacitance of the light receiving element 2 can be reduced by reducing the area of the light receiving element 2. However, reducing the area of the light receiving element 2 causes a problem that the optical current supplied from the light receiving element 2 is reduced and coupling to the optical fiber, which transmits an optical signal, becomes difficult.

Furthermore, in the conventional optical transceiver shown in FIGS. 19 and 20, the light emitting element 1 emits light in response to the forward bias voltage supplied from the power supply, and the light receiving element 3 converts an optical signal to an electric signal in response to the reverse bias voltage supplied from the power supply. Therefore, the light emitting element 1 depends upon the power supply voltage, and the light emitting element 1 cannot be supplied with a voltage exceeding the power supply voltage. The light receiving element 3 also depends upon the power supply voltage, and the light receiving element 3 cannot be supplied with a voltage exceeding the power supply voltage. As a result, the rate of the optical signal, which the light receiving element 3 can receive, is limited by the power supply voltage.

Documents related with the Related Background Art described above are Japanese Patent Laid-Open No. H6-216738 and No. H4-113713.

SUMMARY OF THE INVENTION

An optical receiver comprises a first light receiving element to convert an optical signal to an electric signal and to output the electric signal from one end thereof; and a light receiving element row connected to the other of the ends of said first light receiving element to supply electric power to said first light receiving element, said light receiving element row including a plurality of second light receiving elements connected in series.

An optical transmitter comprises a light emitting element of surface light emission type to convert an electric signal to an optical signal and transmit the optical signal; and a light receiving element row exposed to light emitted from said light emitting element to generate electric power, said light receiving element row including a plurality of light receiving elements connected in series, wherein light emitted from a top surface of said light emitting element is used as an optical signal, and said light receiving element row is exposed to light emitted from a rear surface of said light emitting element.

An optical transceiver comprises a light emitting element to convert an electric signal to an optical signal and transmit the optical signal; a first light receiving element to receive the optical signal and convert the optical signal to an electric signal, then output the electric signal; and a light receiving element row including a plurality of second light receiving elements connected in series between said light emitting element and said first light receiving element, said light receiving element row being exposed to light emitted from said light emitting element, and thereby said light receiving element row supplying electric power to said first light receiving element.

DETAILED DESCRIPTION OF THE INVENTION

Hereafter, embodiments of the present invention will be described with reference to the drawings. These embodiments do not restrict the present invention.

First, embodiments of an optical receiver according to the present invention will now be described. The embodiments of an optical receiver according to the present invention include a light receiving element row formed of a plurality of light receiving elements connected in series. When the light receiving element row is exposed to light, the light receiving element row generates an optical voltage greater than a power supply voltage. By applying the optical voltage to the light receiving elements, the optical receiver can cope with high-rate communication.

FIRST EMBODIMENT

Figure 1A:
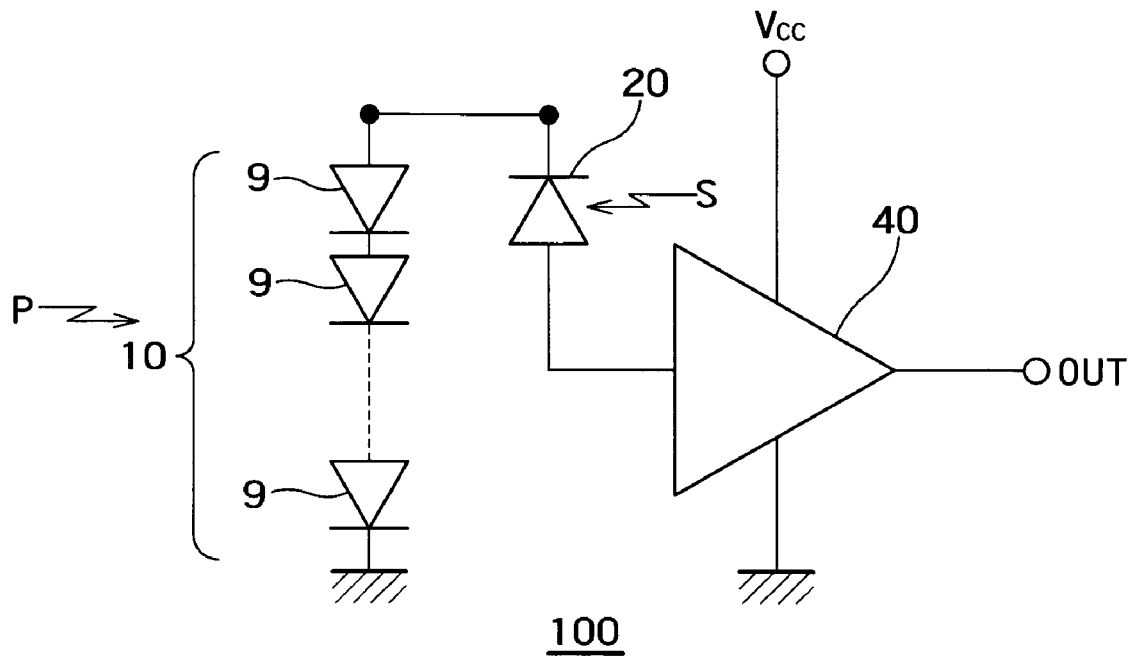
FIG. 1A is a circuit diagram of an optical receiver according to a first embodiment of the present invention.

FIG. 1A is a circuit diagram of an optical receiver 100 according to a first embodiment of the present invention. The optical receiver 100 includes light receiving elements 9, a light receiving element 20 and an amplifier circuit 40. A plurality of light receiving elements 9 are connected in series and generate electric power, being exposed to light P. A plurality of light receiving elements 9 connected in series are herein referred to as a light receiving element row 10. The light receiving element row 10 is connected on its cathode side to the ground, and connected on its anode side to a cathode of the light receiving element 20. The light receiving element 20 is connected at its anode to an input terminal of the amplifier circuit 40. The light receiving element 20 receives an optical signal S from optical fiber (not shown), and converts the optical signal S to an optical current (hereafter also referred to as "electric signal"). The amplifier circuit 40 receives electric power from a power supply Vcc, and thereby amplifies the electric signal output from the light receiving element 20. After amplifying the electric signal, the amplifier circuit 40 outputs the electric signal via an output terminal OUT.

SECOND EMBODIMENT

Figure 1B:
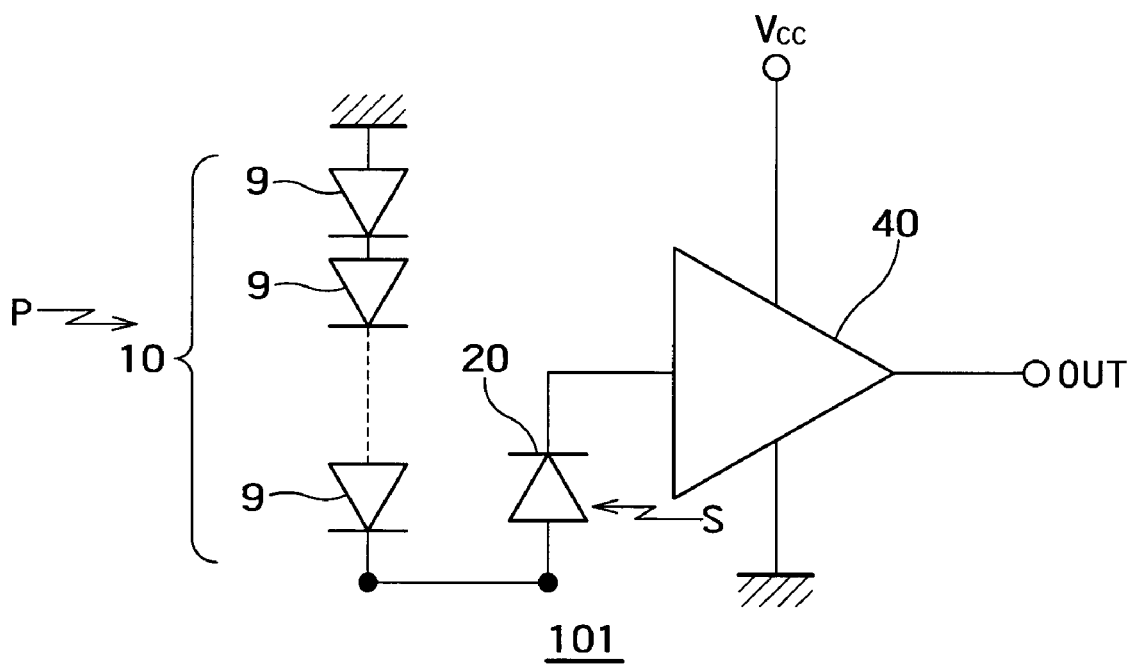
FIG. 1B is a circuit diagram of an optical receiver according to a second embodiment of the present invention.

FIG. 1B shows an optical receiver 101 according to a second embodiment of the present invention. The optical receiver 101 is different from the optical receiver 100 in that the anode side of the light receiving element row 10 is connected to the ground GND and the cathode side of the light receiving element row 10 is connected to the light receiving element 20. In addition, the optical receiver 101 is different from the optical receiver 100 in that the anode side of the light receiving element 20 is connected to the light receiving element row 10 and the cathode side of the light receiving element 20 is connected to the input terminal of the amplifier circuit 40.

Each of the light receiving elements 9 and the light receiving element 20 is, for example, a photodiode or the like. The light receiving elements 9 may be different from each other in characteristics. Preferably, however, the light receiving elements 9 have the same characteristics. As a result, electric power generated by the light receiving element row 10 can be controlled by the number of the light receiving elements 9 connected in series. If a plurality of the light receiving elements 9 share the same characteristics, then the optical receiver 100 can be manufactured relatively easily. The characteristics of a light receiving element referred to as herein include an element size, an efficiency of conversion from an optical signal to an optical current or optical voltage, and parasitic capacitance.

Figure 3:
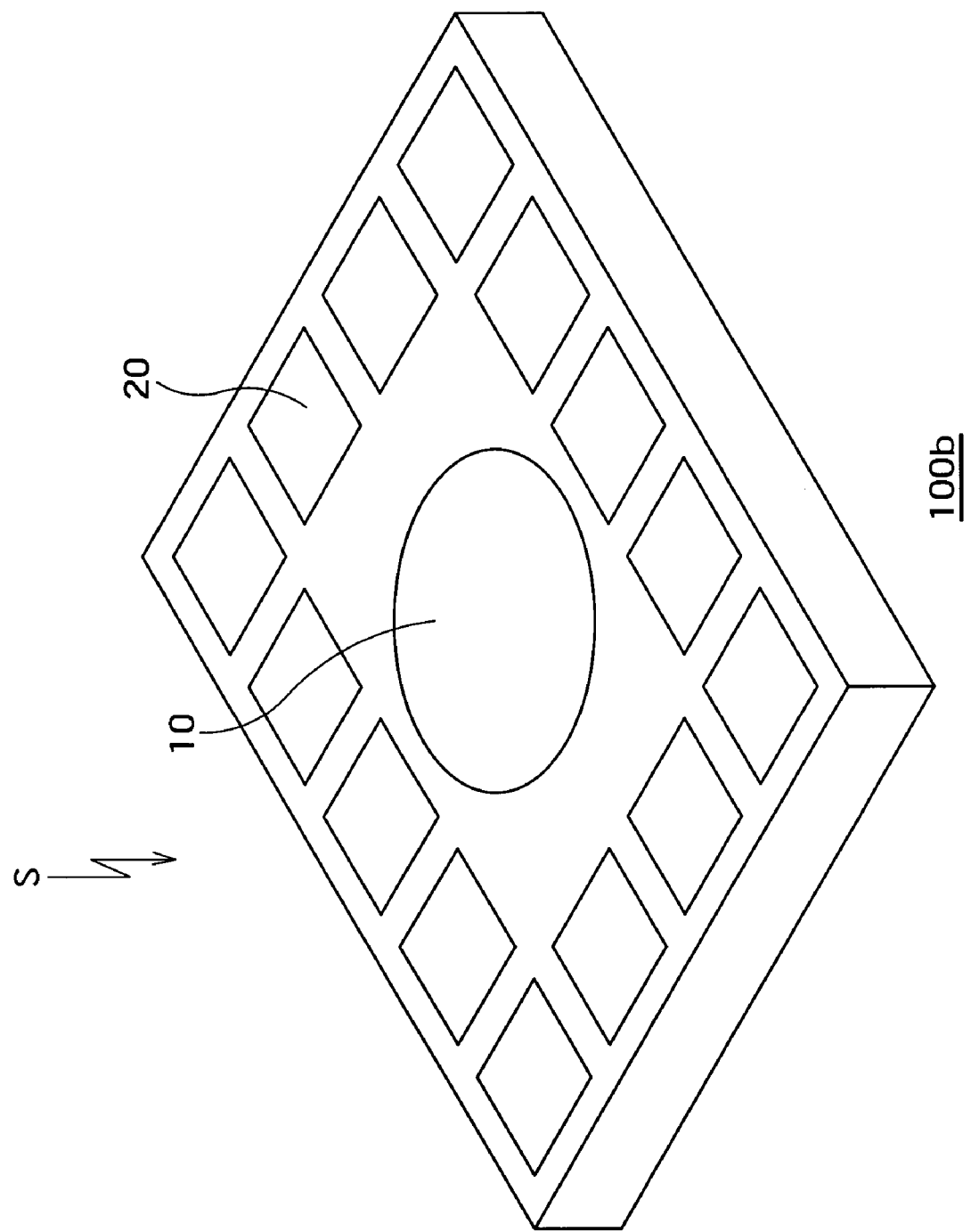
FIG. 3 is a schematic diagram showing an optical receiver 100b as a second variant of the optical receiver 100.

From the viewpoint that the optical receiver 100 can be manufactured easily, each of the light receiving elements 9 may be the same in characteristics as the light receiving element 20. However, the characteristics of the light receiving elements 9 may be made different from those of the light receiving element 20. For example, in the case where the same reverse bias voltage is applied to each of the light receiving elements 9 and the light receiving element 20, the capacitance and the resistance of each of the light receiving elements 9 for high frequency signals may be greater than those of the light receiving element 20. In the case where both the light receiving elements 9 and the light receiving element 20 are exposed to an optical signal S as shown in FIG. 3, the light receiving element 20 can receive the optical signal S as a signal, whereas the light receiving elements 9 can receive the optical signal S as a continuous light and can continuously generate power.

According to the first and second embodiments, the number of the light receiving elements 9 is adjusted according to intensity of light P that the light receiving element row 10 is exposed to. As a result, the output voltage of the light receiving element row 10 can become greater than the power supply voltage Vcc. When the output voltage of the light receiving element row 10 exceeds the power supply voltage Vcc, since the reverse bias voltage applied to the light receiving element 20 exceeds the power supply voltage Vcc, the capacitance and resistance of the light receiving element 20 for high frequency signals become smaller than those in the conventional technique. As a result, the optical receiver 100 can cope with high-rate communication without depending upon the power supply voltage Vcc.

Figure 2:
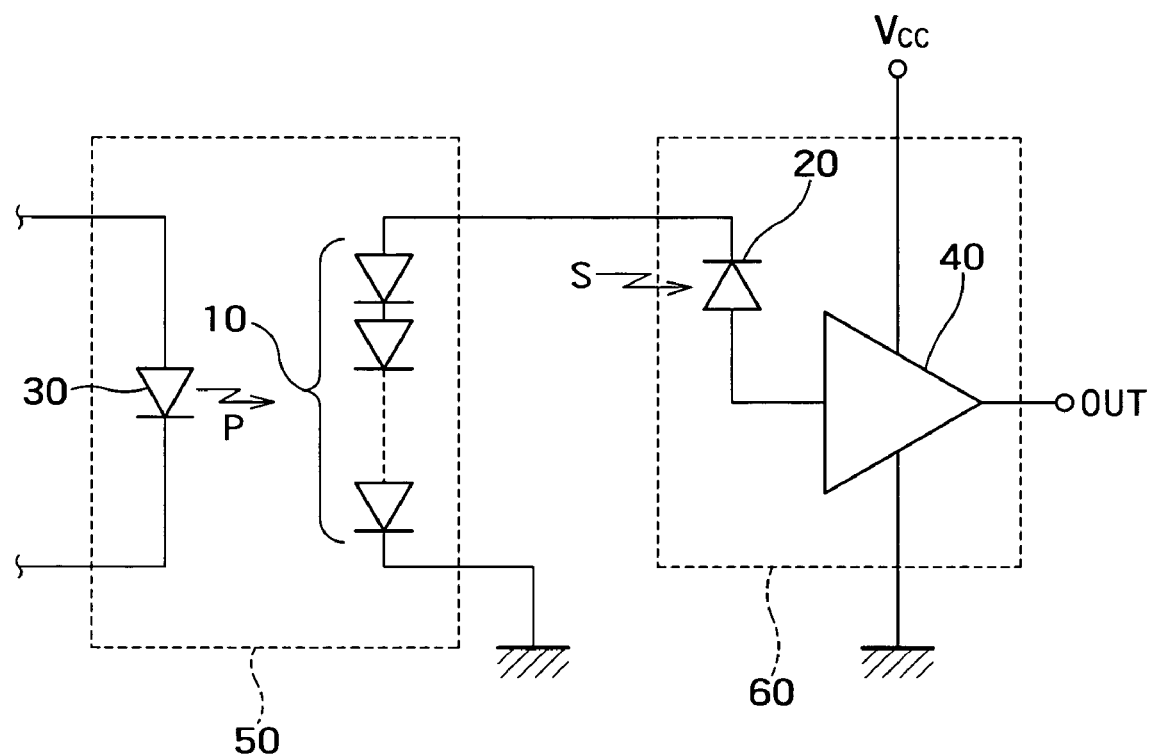
FIG. 2 is a schematic diagram showing an optical receiver 100a as a first variant of an optical receiver 100.

FIG. 2 is a schematic diagram showing an optical receiver 100a as a first variant of the optical receiver 100. In the optical receiver 100a, the light receiving element row 10 and the light receiving element 20 are formed as independent chips. The light receiving element row 10 forms an electromotive force device 50 in conjunction with a light emitting element 30. The light emitting element 30 is supplied with electric power from the outside, and thereby emits light. The light receiving element row 10 is exposed to light emitted from the light emitting element 30, and generates electric power. The light emitting element 30 is, for example, an LED or a laser diode or the like. The light emitting element 30 may be supplied with electric power by the power supply voltage Vcc. The light emitting element 30 need not be a device for transmission.

The light receiving element 20 forms a receiver device 60 in conjunction with the amplifier circuit 40.

The optical receiver 100a has effects similar to those of the optical receiver 100. In addition, the light receiving element row 10 and the light receiving element 20 are independent in the optical receiver 100a. Therefore, the light receiving element row 10 can generate electric power irrespective of an optical signal S.

FIG. 3 is a schematic diagram showing an optical receiver 100b as a second variant of the optical receiver 100. The optical receiver 100b is different from the optical receiver 100a in that the light receiving element row 10 and the light receiving element 20 are integrated on the same chip. Therefore, the light receiving element row 10 is exposed to an optical signal S together with the light receiving element 20, and thereby generates electric power. In the optical receiver 100b shown in FIG. 3, the light receiving element row 10 is disposed in a central part of the optical receiver 100b where the emission of the optical signal S is the most intensive, and the light receiving element 20 is disposed in its peripheral part. As a result, the light receiving element row 10 can supply sufficiently great electric power to the light receiving element 20. On the other hand, the light receiving element 20 may be disposed in the central part of the optical receiver 100b and the light receiving element row 10 may be disposed in its peripheral part so that the light receiving element 20 may receive a signal accurately.

The optical receiver 100b has effects similar to those of the optical receiver 100. In addition, since the light receiving element row 10 generates electric power by using the optical signal S in the optical receiver 100b, a light emitting element, which is dedicated to the light receiving element row 10, is not needed. In addition, since the light receiving element row 10 and the light receiving element 20 are integrated on the same chip, the optical receiver 100b in the present embodiment can be reduced in size as compared with the optical receiver 100a.

In the optical receiver 100b, an amplifier circuit 40 may be further incorporated on the chip having the light receiving element row 10 and the light receiving element 20 formed thereon. As a result, the optical receiver 100b can be further reduced in size.

THIRD EMBODIMENT

Figure 4:
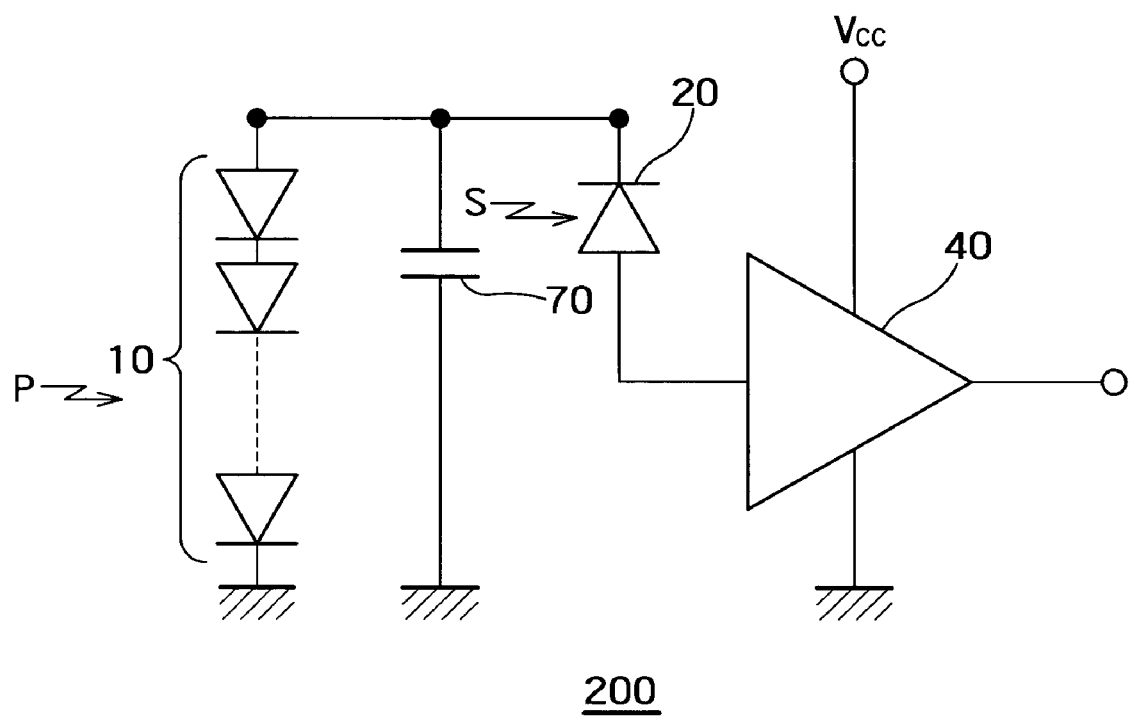
FIG. 4 is a circuit diagram of an optical receiver 200 according to a third embodiment of the present invention.
Figure 5:
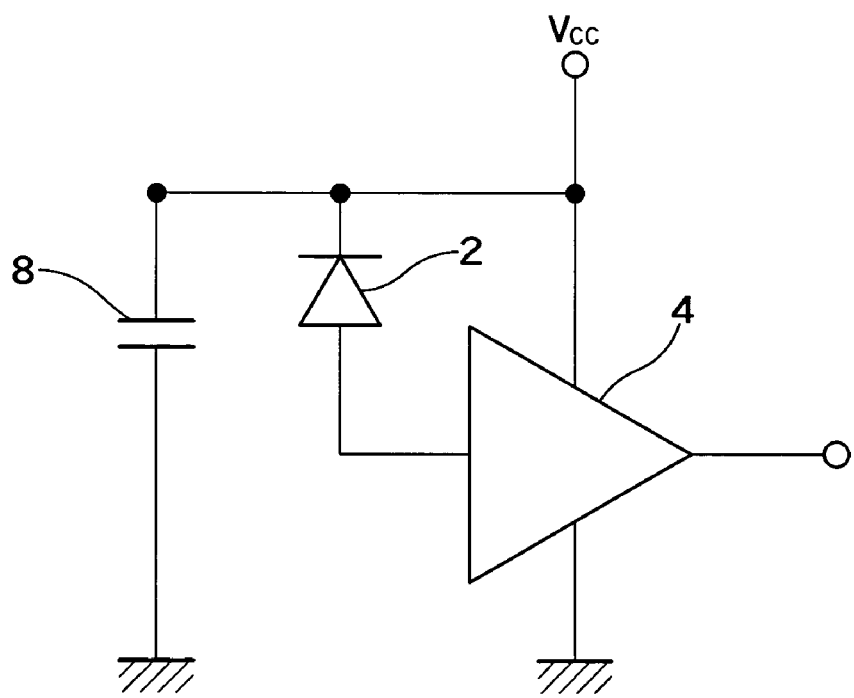
FIG. 5 is a circuit diagram of a conventional optical receiver.

FIG. 4 is a circuit diagram of an optical receiver 200 according to a third embodiment of the present invention. An optical receiver 200 is different from the first embodiment in that a capacitor 70 connected in parallel with the light receiving element row 10 is further provided. When the electric power supplied from the light receiving element row 10 has changed temporarily, the capacitor 70 can compensate for the electric power change. For example, when irradiation intensity of light P has become weak temporarily, the capacitor 70 can supply electric charge to the light receiving element 20 to some degree instead of the light receiving element row 10. When the irradiation intensity of light P has increased temporarily, the capacitor 70 can store the electric charge to some degree instead of the light receiving element row 10. In other words, the capacitor 70 can smooth noise that has occurred in electric power supplied from the light receiving element row 10 to the light receiving element 20. The electric power can be further stabilized by increasing the capacitance of the capacitor 70.

Although the light receiving element row 10 generates electric power by using the light P in FIG. 4, the light receiving element row 10 may generate electric power by using an optical signal S. Since the optical signal S is formed of a high voltage (high) and a low voltage (low), electric power generated by the light receiving element row 10 is not typically stabilized in this case. However, since the capacitor 70 smoothes the optical electromotive force generated from the light receiving element row 10, an approximately constant voltage is supplied to the light receiving element 20.

In addition, in the present embodiment, effects similar to those of the first embodiment can be obtained. The capacitor 70 may be formed as a chip different from that of the light receiving element row 10 and the light receiving element 20. For the purpose of reducing the size, the capacitor 70 may be formed as the same chip as the light receiving element row 10 or the light receiving element 20. In addition, the capacitor 70 may be formed as the same chip as both of the light receiving element row 10 and the light receiving element 20. As a result, the optical receiver 200 is further reduced in size. The capacitor 70 may be formed as the same chip as the light receiving element row 10, the light receiving element 20, and the amplifier circuit 40. As a result, the optical receiver 200 is further reduced in size.

In the embodiments shown in FIGS. 2 to 4, respective connection relations of the light receiving element row 10 and the light receiving element 20 are the same as those in the optical receiver 100 shown in FIG. 1A. However, the respective connection relations of the light receiving element row 10 and the light receiving element 20 in the embodiments shown in FIGS. 2 to 4 may be the same as those in the optical receiver 101 shown in FIG. 1B. In other words, in the embodiments shown in FIGS. 2 to 4, the senses of the light receiving element row 10 and the light receiving element 20 may be reversed. In this case as well, the embodiments shown in FIGS. 2 to 4 have their respective effects.

The optical receivers according to the embodiments can cope with high-rate communication without being limited in power supply voltage.

Embodiments of an optical transmitter and an optical transceiver will now be described. In the embodiments of the optical transceiver according to the present invention, top surface light of a light emitting element of surface light emission type is used as an optical signal, and its rear surface light is used to expose the light receiving element row. As a result, the light receiving element row can generate electric power greater than the power supply voltage.

FOURTH EMBODIMENT

Figure 6:
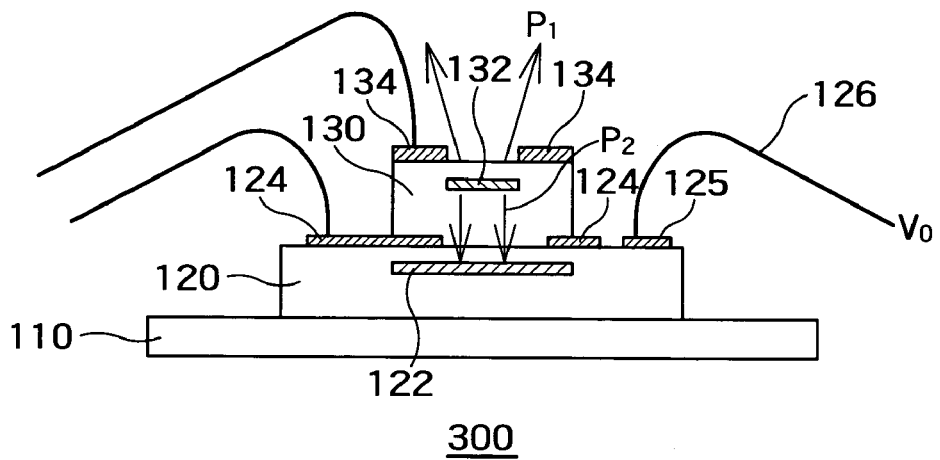
FIG. 6 is a sectional view of an optical transmitter 300 according to a fourth embodiment of the present invention.

FIG. 6 is a sectional view of an optical transmitter 300 according to a fourth embodiment of the present invention. The optical transmitter 300 includes a lead frame 110, a light receiving chip 120, and an optical transmitter chip 130. The lead frame 110 is formed of a conductive material such as metal. The light receiving chip 120 is mounted on the lead frame 110. The optical transmitter chip 130 is mounted on the light receiving chip 120.

A light receiving element row 122, which is formed of a plurality of light receiving elements connected in series, is formed in the light receiving chip 120. A light emitting element 132 is formed in the optical transmitter chip 130 to convert an electric signal to an optical signal. The light receiving elements are formed of, for example, photodiodes. In this case, the light receiving element row 122 becomes a photodiode array. The light emitting element 132 is a light emitting element of surface light emission type, and it is, for example, an LED or a VCSEL (Vertical Cavity Surface-Emitting Laser).

A material existing between the light receiving element row 122 and the light emitting element 132 is transparent to light (light-transparent) so as to transmit light emitted from the light emitting element 132 to the light receiving element row 122.

The optical transmitter 300 further includes electrodes 124, 125 and 134. The electrode 124 is provided between the light receiving chip 120 and the optical transmitter chip 130, and connected to one of the electrodes of the light emitting element 132. The electrode 134 is provided on the optical transmitter chip 130, and connected to the other of the electrodes of the light emitting element 132. The electrode 124 is connected to a reference potential such as the ground. The electrode 134 is connected to, for example, an amplifier circuit (not shown) to amplify an electric signal for transmission. The electrode 125 is provided on the light receiving chip 120, and connected to one of the electrodes of the light receiving element row 122. In addition, the lead frame 110 is connected to the other of the electrodes of the light receiving element row 122. Furthermore, the lead frame 110 is connected to the reference potential such as the ground.

Figure 7:
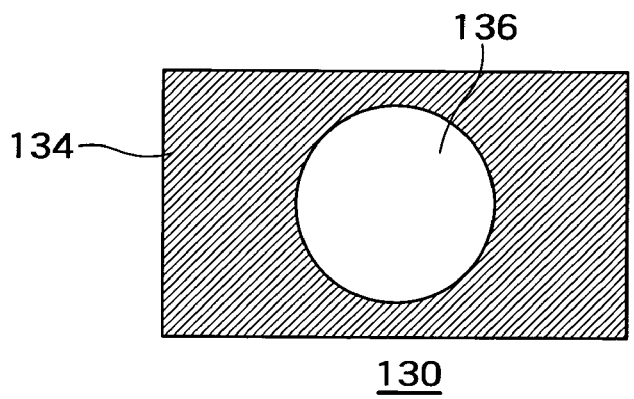
FIG. 7 is a top view of a light emitting element 130.
Figure 8:
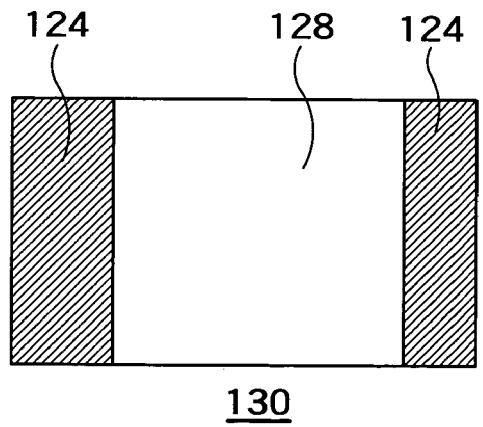
FIG. 8 is a bottom view of the light emitting element 130.

FIGS. 7 and 8 are a top view and a bottom view of the light emitting element 130, respectively. An electrode 134 shown in FIG. 7 covers the surface of the light emitting element 130 other than an opening part 136. The opening part 136 is provided to transmit top surface light $P_1$ emitted from the light emitting element 132. The electrodes 124 shown in FIG. 8 are provided on left and right sides of the rear surface of the light emitting element 130. A light transmitting part 128 formed between the electrodes 124 is provided to transmit rear surface light $P_2$ which is emitted from the light emitting element 132 to the light receiving element row 122.

Operation of the optical transmitter 300 will now be described.

When an electric signal is input to the electrode 134, a potential difference occurs between the electrode 124 and the electrode 134. Because of the potential difference, a forward bias voltage is applied to the light emitting element 132. Since the light emitting element 132 is the surface light emission type, the light emitting element 132 emits light from its top surface and its bottom surface because of the forward bias voltage. Top surface light $P_1$, which is emitted from the top surface of the light emitting element 132, is transmitted to a light receiving element of the other party side via a medium such as space or optical fiber (not shown) as an optical signal. On the other hand, rear surface light $P_2$, which is emitted from the rear surface of the light emitting element 132, is applied to the light receiving element row 122.

When the light receiving element row 122 is exposed to light, a potential difference is generated between the anode and cathode of the light receiving element row 122. Since the lead frame 110 is connected to the ground in the present embodiment, the potential difference, which is generated by the light receiving element row 122, is output from the electrode 125 as an output voltage $V_o$.

If the signal transmitted from the light emitting element 132 is comparatively slow in rate, the output voltage $V_o$ of the light receiving element row 122 depends upon the signal rate. If the signal rate is comparatively fast, however, the output voltage $V_o$ becomes a generally DC voltage. This is because in general, the light receiving element row has capacitance therein.

Figure 9:
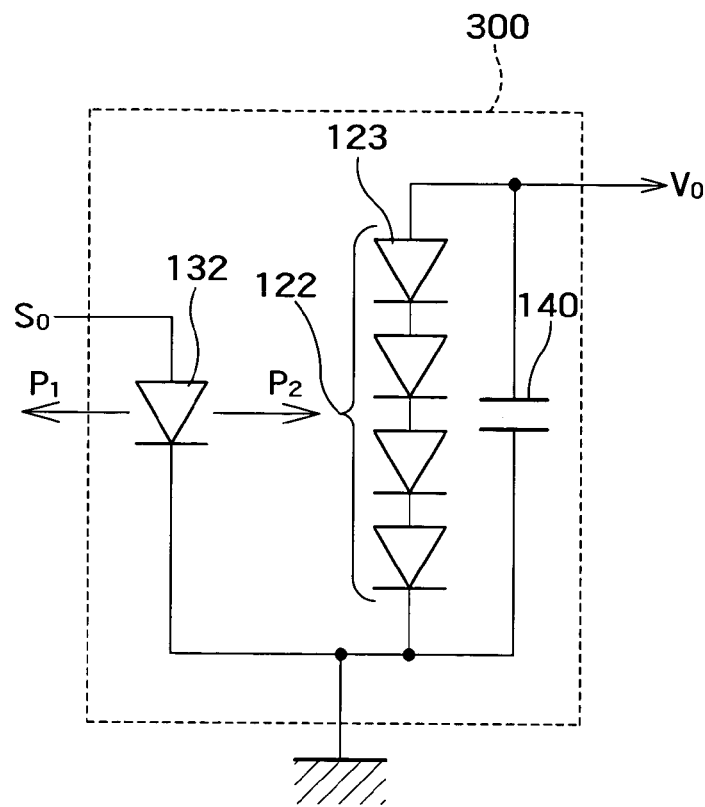
FIG. 9 is an equivalent circuit diagram of the optical transmitter 300.
Figure 10:
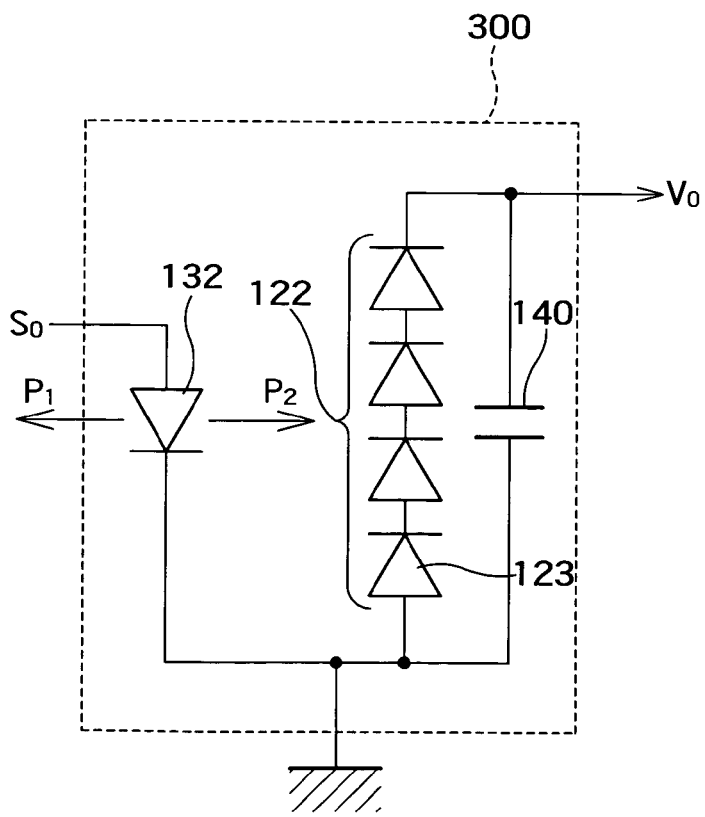
FIG. 10 is an equivalent circuit diagram of the optical transmitter 300.

In the case where the signal rate is comparatively slow, when a capacitor 140 is connected in parallel with the light receiving element row 122 as shown in FIGS. 9 and 10, the output voltage $V_o$, which is so stable that it is nearly a DC voltage, can be obtained from the light receiving element row 122.

Even in the case where signal transmission is not conducted, the light emitting element typically transmits a dummy signal such as an idle signal or a low rate on/off signal. Even in the waiting time during which transmission is not conducted, therefore, the light receiving element row 122 can output the output voltage $V_o$. The use of the output voltage $V_o$ is not especially restricted. For example, the output voltage $V_o$ may be used to give a reverse bias voltage to a light receiving element which receives an optical signal as described later.

The output voltage $V_o$ depends upon the number of light receiving elements 123 which are connected in series in the light receiving element row 122. Therefore, the output voltage $V_o$ can be made greater than the power supply voltage by adjusting the number of the light receiving elements 123. The light receiving element 123 is, for example, a photodiode. A plurality of the light receiving elements 123 may have different characteristics respectively. Preferably, however, the light receiving elements 123 have the same characteristics as each other. As a result, electric power generated by the light receiving element row 122 can be controlled easily by adjusting the number of the light receiving elements 123 connected in series. Furthermore, since a plurality of the light receiving elements 123 have the same characteristics as each other, the optical transmitter 300 can be manufactured comparatively easily. The characteristics of a light receiving element referred to as herein include an element size, an efficiency of conversion from an optical signal to an optical current or optical voltage, and parasitic capacitance.

Figure 16:
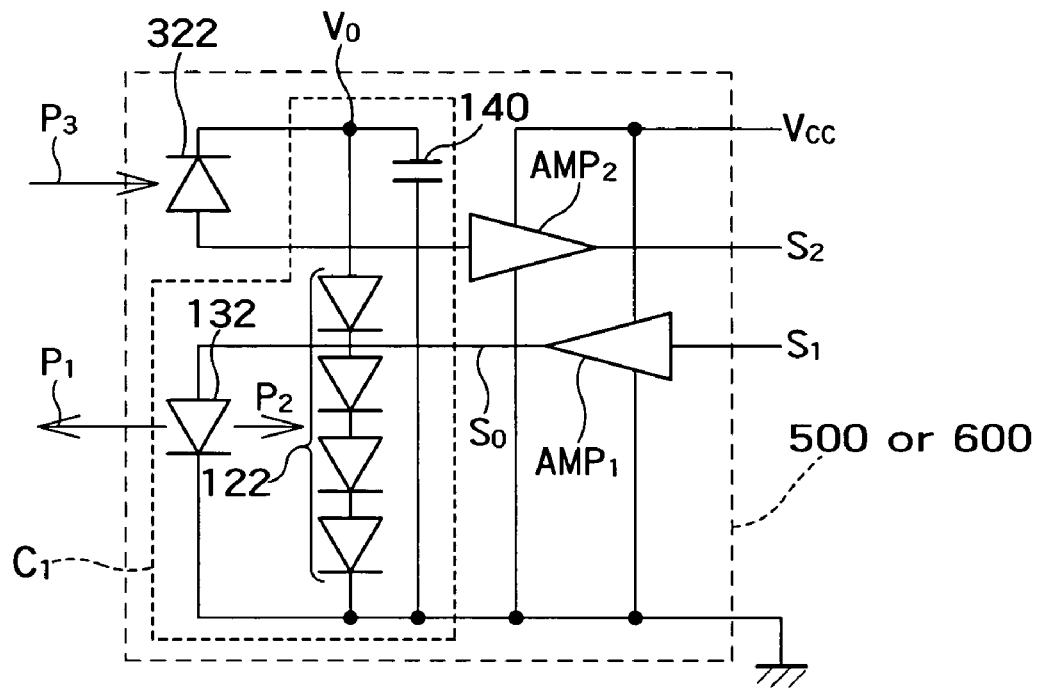
FIG. 16 is an equivalent circuit diagram of the optical transceiver 500 or 600 shown in FIG. 14 or FIG. 15.

The optical transmitter 300 according to the present embodiment can supply a voltage greater than a power supply voltage Vcc supplied from the outside (see FIG. 16). The top surface light $P_1$ of the light emitting element 132 is used in communication as an optical signal, and its rear surface light $P_2$ is used to supply electric power. In other words, the light emitting element 132 is used for both signal transmission and electric power supply. As a result, the optical transmitter 300 can be reduced in size comparatively.

FIGS. 9 and 10 are equivalent circuit diagrams of the optical transmitter 300. With reference to the circuit diagram shown in FIG. 9, the light emitting element 132 emits light according to an electric signal $S_o$ for transmission input from its anode. The light receiving element row 122 is exposed to the rear surface light $P_2$ emitted from the light emitting element 132, and thereby outputs the output voltage $V_o$ from its anode. Each of the cathodes of the light receiving element row 122 and the light emitting element 132 is connected to the ground in common.

In the present embodiment, a capacitor 140 is connected in parallel with the light receiving element row 122. The capacitor 140 is connected between, for example, the electrode 124 and the lead frame 110 shown in FIG. 6. The capacitor 140 may also be provided outside the optical transmitter 300. The capacitor 140 may also be parasitic capacitance in the light receiving chip 120. The output voltage $V_o$ is smoothed by the capacitor 140, therefore, the optical transmitter 300 can output a stable output voltage $V_o$.

The circuit diagram shown in FIG. 10 differs from the circuit diagram shown in FIG. 9 in that the anode of the light receiving element row 122 is connected to the ground and the output voltage $V_o$ is output from the cathode of the light receiving element row 122. Except for this difference, the configuration of the circuit diagram shown in FIG. 10 is the same as that of the circuit diagram shown in FIG. 9. In each of the circuit configurations shown in FIGS. 9 and 10, the effects of the optical transmitter 300 are not lost.

FIFTH EMBODIMENT

Figure 11:
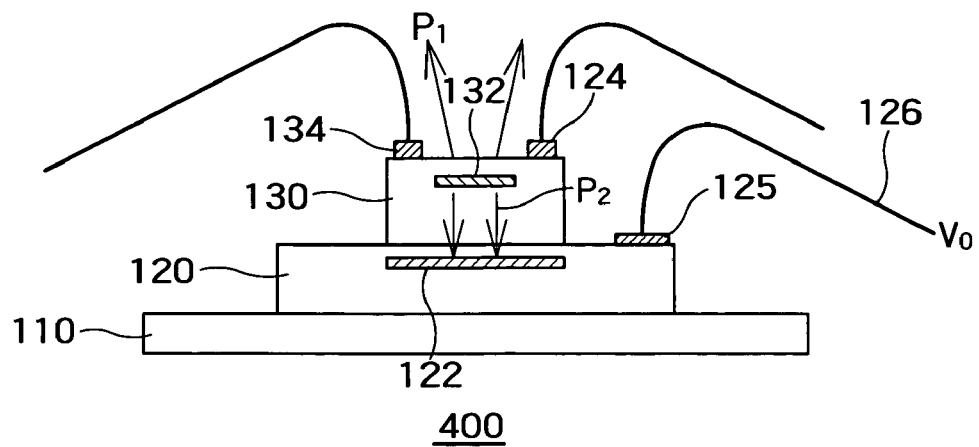
FIG. 11 is a sectional view of an optical transmitter 400 according to a fifth embodiment of the present invention.

FIG. 11 is a sectional view of an optical transmitter 400 according to a fifth embodiment of the present invention. The optical transmitter 400 differs from the fourth embodiment in that the electrode 124 is provided on the top surface of the optical transmitter chip 130.

Figure 12:
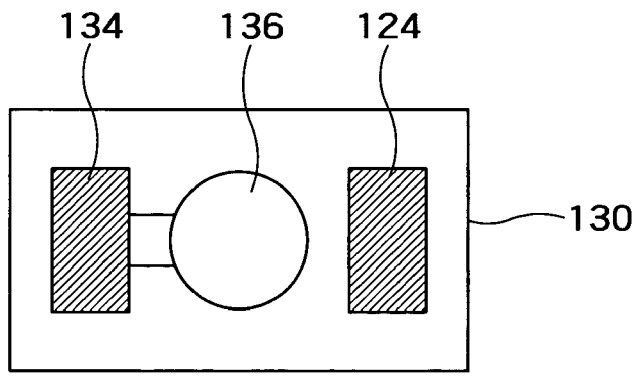
FIG. 12 is a top view of an optical transmission chip 130 in an optical transmitter 400.
Figure 13:
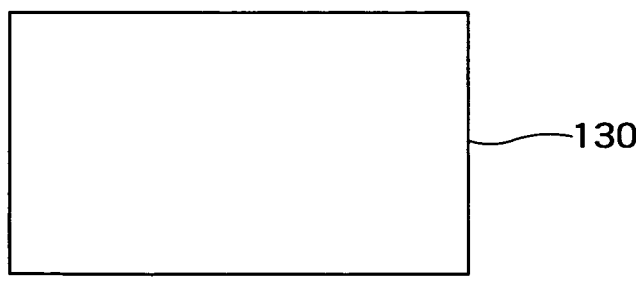
FIG. 13 is a bottom view of the optical transmission chip 130 in the optical transmitter 400.

FIGS. 12 and 13 are a top view and a bottom view of the optical transmitter chip 130 in the optical transmitter 400, respectively. It will be appreciated from FIG. 12 that the electrodes 124 and 134 are provided on the top surface of the optical transmitter chip 130 so as to be disposed across an opening part 136 from each other. As shown in FIG. 13, electrodes are not provided on a bottom surface of the optical transmitter chip 130.

Unlike the fourth embodiment, the optical transmitter 400 does not have an electrode between the optical transmitter chip 130 and the light receiving chip 120. According to the present embodiment, therefore, electrodes do not intercept the rear surface light $P_2$. Furthermore, the present embodiment is easier than the first embodiment in manufacture. In addition, the present embodiment has effects similar to those of the fourth embodiment.

SIXTH EMBODIMENT

Figure 14:
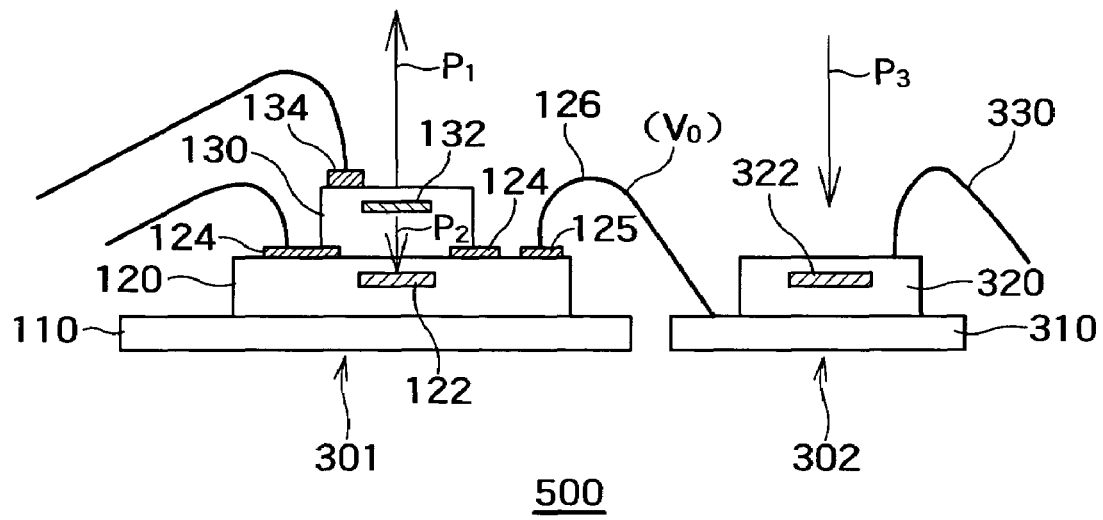
FIG. 14 is a sectional view of an optical transceiver 500 according to a sixth embodiment of the present invention.

FIG. 14 is a sectional view of an optical transceiver 500 according to a sixth embodiment of the present invention. The present embodiment differs from the fourth and fifth embodiments in that not only the optical transmitter but also an optical receiver is provided. In other words, it can be said that the present embodiment is an embodiment obtained by applying an optical transmitter according to the fourth or fifth embodiment to an optical receiver.

An optical transmitter 301 may be either of the optical transmitter 300 shown in FIG. 6 and the optical transmitter 400 shown in FIG. 11. A voltage $V_o$ output from the optical transmitter 301 is applied to an optical receiver 302.

The optical receiver 302 includes a lead frame 310 and an optical receiver chip 320. Preferably, the lead frame 310 is formed of the same material as that of the lead frame 110. The optical receiver chip 320 includes a light receiving element 322. The light receiving element 322 is, for example, a photodiode. The light receiving element 322 receives an optical signal $P_3$, and converts the optical signal $P_3$ to an electric signal. Then, the light receiving element 322 outputs the electric signal via a lead wire 330.

The lead frame 310 is connected to one of the anode and cathode electrodes of the light receiving element 322. The lead wire 330 is connected to the other of the anode and cathode electrodes of the light receiving element 322.

A light receiving element row 122 corresponds to the light receiving element row 10 in the first to third embodiments concerning the optical receiver. The light receiving element 322 corresponds to the light receiving element 20 in the first to third embodiments.

According to the present embodiment, a lead wire 126 connected to an electrode 125 in the optical transmitter 301 is connected to the lead frame 310. As a result, the optical transmitter 301 can supply the output voltage $V_o$ to the light receiving element 322. The light receiving element 322 is reverse-biased by the output voltage $V_o$, and the light receiving element 322 can convert an optical signal $P_3$ to an electric signal. As described above, the output voltage $V_o$ can become a voltage greater than the external power supply voltage Vcc (see FIG. 16). Therefore, the light receiving element 322 can be subjected to a reverse bias voltage greater than the external power supply voltage Vcc. As a result, the capacitance and resistance of the light receiving element 322 for high frequency signals becomes comparatively small, and the light receiving element 322 can cope with high rate communication.

SEVENTH EMBODIMENT

Figure 15:
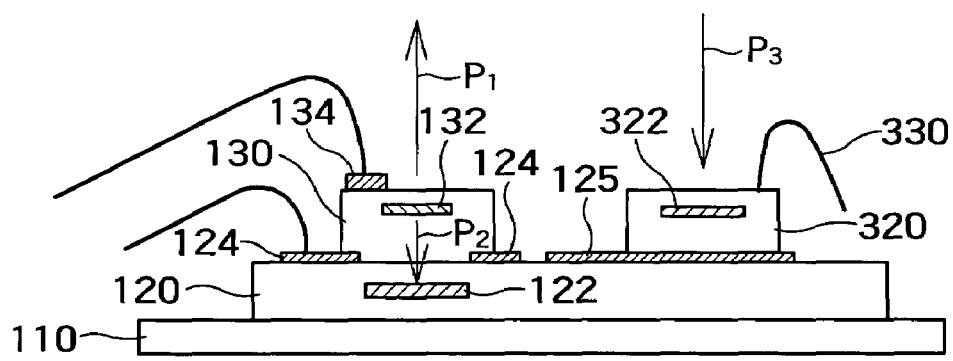
FIG. 15 is a sectional view of an optical transceiver 600 according to a seventh embodiment of the present invention.

FIG. 15 is a sectional view of an optical transceiver 600 according to a seventh embodiment of the present invention. The present embodiment differs from the sixth embodiment in that the optical transmitter and the optical receiver are integrated as one body. In the present embodiment, an optical transmitter chip 130 and an optical receiver chip 320 are mounted on a common light receiving chip 120. The light receiving chip 120 is mounted on a single lead frame 110. Since the optical transceiver 600 is mounted on the single lead frame 110, the number of components included in the optical transceiver 600 becomes small.

In the sixth embodiment, one of the electrodes of the light receiving element 322 is connected to the lead frame 110. In the present embodiment, however, one of the electrodes of the light receiving element 322 is connected directly to the electrode 125 to which the output voltage $V_o$ is output. In the present embodiment, therefore, the output voltage $V_o$ can be supplied to the light receiving element 322 without being attenuated by resistance of the lead wire 126 or the like. In addition, the lead wire 126 becomes unnecessary. As a result, bonding of the lead wire 126 also becomes unnecessary. In addition, the present embodiment has effects similar to those of the sixth embodiment.

FIG. 16 is an equivalent circuit diagram of the optical transceiver 500 or 600 shown in FIG. 14 or 15. A circuit enclosed in a broken line frame $C_1$ corresponds to the circuit shown in FIG. 9. The anode of the light emitting element 132 is connected to an output terminal of an amplifier circuit $AMP_1$. The cathode of the light emitting element 132 is connected to the ground. The anode of the light receiving element 322 is connected to an input terminal of an amplifier circuit $AMP_2$. The anode of the light receiving element row 122 is connected to the cathode of the light receiving element 322. The cathode of the light receiving element row 122 is connected to the ground.

A signal $S_1$ for transmission is amplified in the amplifier circuit $AMP_1$, and supplied to the light emitting element 132 as the signal $S_0$ for transmission shown in FIG. 9. As a result, the light emitting element 132 emits light $P_1$ and $P_2$. The light receiving element row 122 receives the light $P_2$, and outputs an output voltage $V_o$ greater than the external power supply voltage Vcc.

The output voltage $V_o$ is applied to the light receiving element 322 as the reverse bias voltage. As a result, the light receiving element 322 can receive an optical signal $P_3$, and convert the optical signal $P_3$ to an electric signal. This electric signal is amplified in an amplifier circuit $AMP_2$, and output as a signal $S_2$. In the circuit shown in FIG. 16, the output voltage $V_o$ is a voltage higher than the ground.

Figure 17:
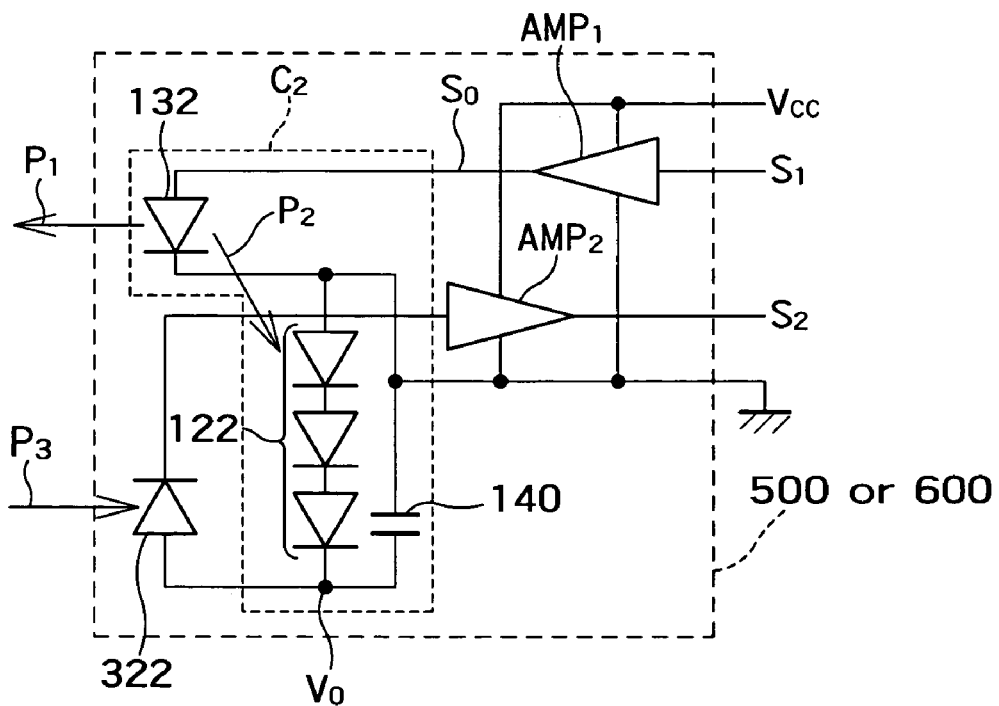
FIG. 17 is an equivalent circuit diagram of the optical transceiver 500 or 600 shown in FIG. 14 or FIG. 15.

FIG. 17 is an equivalent circuit diagram of the optical transceiver 500 or 600 shown in FIG. 14 or 15. A circuit enclosed in a broken line frame $C_2$ corresponds to the circuit shown in FIG. 10. The anode of the light emitting element 132 is connected to an output terminal of an amplifier circuit $AMP_1$. The cathode of the light emitting element 132 is connected to the ground. The cathode of the light receiving element 322 is connected to an input terminal of an amplifier circuit $AMP_2$. The anode of the light receiving element row 122 is connected to the ground. The cathode of the light receiving element row 122 is connected to the anode of the light receiving element 322.

A signal $S_1$ for transmission is amplified in the amplifier circuit $AMP_1$, and supplied to the light emitting element 132 as the signal $S_o$ for transmission shown in FIG. 10. As a result, the light emitting element 132 emits light $P_1$ and $P_2$. The light receiving element row 122 receives the light $P_2$, and outputs an output voltage $V_o$ greater in absolute value than the external power supply voltage Vcc.

The output voltage $V_o$ is applied to the light receiving element 322 as the reverse bias voltage. As a result, the light receiving element 322 can receive an optical signal $P_3$, and convert the optical signal $P_3$ to an electric signal. This electric signal is amplified in an amplifier circuit $AMP_2$, and output as a signal $S_2$.

The circuit shown in FIG. 17 differs from the circuit shown in FIG. 16 in that the output voltage $V_o$ becomes a voltage lower than the ground. Since the ground is connected to the anode of the light receiving element row 122, however, a reverse bias voltage is applied to the light receiving element row 122. In addition, since the output voltage $V_o$ is greater in absolute value than the external power supply voltage Vcc, the circuit shown in FIG. 17 can operate in the same way as the circuit shown in FIG. 16.

In the circuit shown in FIG. 17, a bias obtained by adding the bias potential of the amplifier circuit $AMP_2$ and the output voltage $V_o$ of the light receiving element row 122 is applied to the light receiving element 322. In other words, in the circuit shown in FIG. 17, a bias greater than that in the circuit shown in FIG. 16 can be applied to the light receiving element 322.

In the circuit shown in FIG. 17, the anode of the light receiving element row 122 is biased to the minus side as compared with the ground potential. Therefore, the noise and fluctuation of the external power supply voltage Vcc are hard to affect the output voltage $V_o$ of the light receiving element row 122.

It is desirable that the light emitting element 132, the light receiving element 322, the light receiving element row 122, the capacitor 140 the amplifier circuit $AMP_1$ and the amplifier circuit $AMP_2$ shown in FIGS. 16 and 17 are incorporated in the same package. As a result, the optical transceiver 300 is reduced in size. Furthermore, the wiring length in the optical transceiver 300 becomes shorter, and wasteful power becomes unnecessary.

EIGHTH EMBODIMENT

Figure 18:
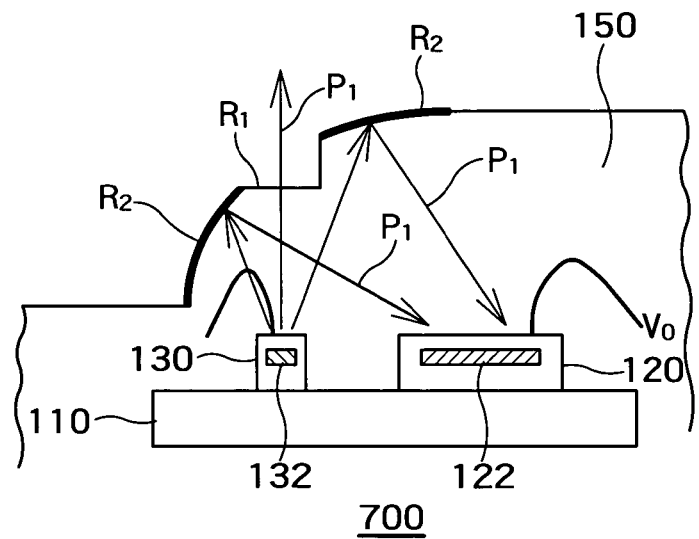
FIG. 18 is a sectional view of an optical transmitter 700 according to an eighth embodiment of the present invention.
Figure 19:
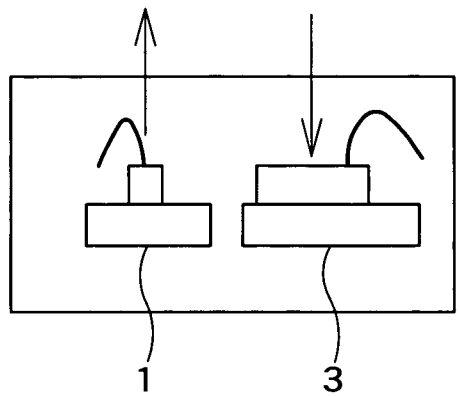
FIG. 19 is a schematic diagram of a conventional optical transceiver.
Figure 20:
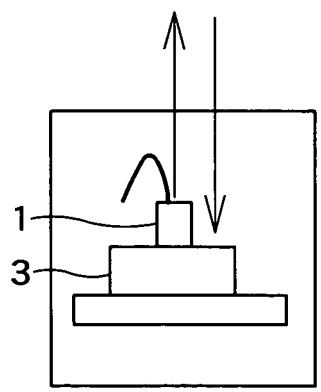
FIG. 20 is a schematic diagram of a conventional optical transceiver.

FIG. 18 is a sectional view of an optical transmitter 700 according to an eighth embodiment of the present invention. A light receiving chip 120 and an optical transmitter chip 130 are disposed side by side on the same lead frame 110. The light receiving chip 120 and the optical transmitter chip 130 are covered by a transparent resin 150.

In a surface region of the transparent resin 150, a region $R_1$ through which top surface light $P_1$ emitted from a light emitting element 132 is cut nearly perpendicularly to the travel direction of the top surface light $P_1$. Thereby, in the top surface light $P_1$, light going straight on can pass through the transparent resin 150 without being reflected in the region $R_1$.

On the other hand, in the surface region of the transparent resin 150, a peripheral region $R_2$ of the region $R_1$ assumes a mirror surface state. In addition, the peripheral region $R_2$ is shaped so as to reflect light emitted from the light emitting element 132 to the light receiving element row 122. In the top surface light $P_1$, light existing around the light going straight on is reflected by the region $R_2$ and applied to the light receiving element row 122. In this way, the top surface light $P_1$ of the light emitting element 132 is not only used as an optical signal, but also a part of the top surface light $P_1$ is applied to the light receiving element row 122. In the present embodiment, both the transmission of optical signals and the generation of electric power in the light receiving element row 122 can be achieved by using only the top surface light $P_1$ of the light emitting element 132.

Coating may be effected on the surface of the transparent resin 150 in order to attain the mirror surface state in the region $R_2$. A reflector may also be provided outside the optical transmitter 700.

In the optical transmitter according to the present embodiment, a voltage greater than the power supply voltage can be supplied. The optical transceiver according to the present embodiment can conduct high-rate communication without depending upon the power supply voltage.

What is claimed is:

1. An optical transceiver comprising:
   a light emitting element to convert an electric signal to an optical signal and transmit the optical signal;
   a first light receiving element to receive an optical signal and convert the optical signal to an electric signal, then output the electric signal;
   a light receiving element row including a plurality of second light receiving elements connected in series between said light emitting element and said first light receiving element, said light receiving element row being exposed to light emitted from said light emitting element, and thereby said light receiving element row supplying electric power to said first light receiving element;
   a first amplifier circuit having an output terminal connected to said light emitting element, said first amplifier circuit amplifying an electric signal and outputting the amplified electric signal to said light emitting element;
   a second amplifier circuit having an input terminal connected to said first light receiving element, said second amplifier circuit amplifying an electric signal supplied from said first light receiving element and outputting the amplified electric signal;
   an anode of said light emitting element is connected to an output terminal of said first amplifier circuit;
   a cathode of said light emitting element is connected to a reference potential;
   an anode of said first light receiving element is connected to an input terminal of said second amplifier circuit;
   an anode of said light receiving element row is connected to a cathode of said first light receiving element; and
   a cathode of said light receiving element row is connected to the reference potential.

* * * * *

UNITED STATES PATENT AND TRADEMARK OFFICE
CERTIFICATE OF CORRECTION

| | |
|---|---|
| PATENT NO. | : 7,248,800 B2 |
| APPLICATION NO. | : 10/685996 |
| DATED | : July 24, 2007 |
| INVENTOR(S) | : Shimada et al. |

It is certified that error appears in the above-identified patent and that said Letters Patent is hereby corrected as shown below:

ON THE TITLE PAGE ITEM (73) DELETE CANON KABUSHIKI KAISHA AND INSERT TOSHIBA KABUSHIKI KAISHA

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,248,800 B2  
APPLICATION NO. : 10/685996  
DATED : July 24, 2007  
INVENTOR(S) : Shimada et al.

Page 1 of 1

It is certified that error appears in the above-identified patent and that said Letters Patent is hereby corrected as shown below:

ON THE TITLE PAGE ITEM (73) DELETE CANON KABUSHIKI KAISHA AND INSERT KABUSHIKI KAISHA TOSHIBA

This certificate supersedes the Certificate of Correction issued March 18, 2008.

Signed and Sealed this

Thirteenth Day of May, 2008

JON W. DUDAS  
*Director of the United States Patent and Trademark Office*